United States Patent
Knepp

[11] Patent Number: 5,957,084
[45] Date of Patent: Sep. 28, 1999

[54] PLANT SUPPORT DEVICE FOR AQUARIUMS AND WATER GARDENS

[76] Inventor: Troy Douglas Knepp, 1109 Frances Ave., Lancaster, Pa. 17601

[21] Appl. No.: 08/990,237

[22] Filed: Dec. 15, 1997

[51] Int. Cl.$^6$ .................................................... A01K 63/06
[52] U.S. Cl. ............................................................. 119/245
[58] Field of Search ................................... 119/245, 246, 119/247, 251, 253; 47/39, 47; 220/4.27

[56] References Cited

U.S. PATENT DOCUMENTS

| | | | |
|---|---|---|---|
| 324,079 | 8/1885 | Burch | 47/39 |
| 942,177 | 12/1909 | Keitsch | 47/39 |
| 2,306,027 | 12/1942 | Swaney | 119/246 |
| 4,001,959 | 1/1977 | Grendahl | 47/39 |
| 4,117,805 | 10/1978 | Ward | 119/246 |
| 5,347,751 | 9/1994 | Carpay | 49/39 |
| 5,451,443 | 9/1995 | Wechsler | 119/245 |
| 5,586,656 | 12/1996 | Abrums | 220/4.27 |
| 5,671,856 | 9/1997 | Lisch | 220/4.27 |
| 5,699,925 | 12/1997 | Petruzzi | 220/4.27 |
| 5,775,260 | 7/1998 | Jansen | 119/246 |

*Primary Examiner*—Robert P. Swiatek
*Assistant Examiner*—Elizabeth Shaw

[57] ABSTRACT

A plant support device for aquariums and water gardens including a plurality of cylindrical base members each having an annular flange extending upwardly therefrom. A planar lower end has an annular recess formed therein. The annular recess is of an equal diameter as that of the annular flange whereby an annular flange of a first cylindrical base member being received within an annular recess of a second cylindrical base member in a stacked configuration. An uppermost cylindrical base member is adapted for coupling with a lower end of a potted plant.

3 Claims, 3 Drawing Sheets

PLANT SUPPORT DEVICE FOR AQUARIUMS AND WATER GARDENS

BACKGROUND OF THE INVENTION

1. Field of the Invention

The present invention relates to a plant support device for aquariums and water gardens and more particularly pertains to supporting plants for use within a water environment with a plant support device for aquariums and water gardens.

2. Description of the Prior Art

The use of plant stands is known in the prior art. More specifically, plant stands heretofore devised and utilized for the purpose of supporting plants are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,309,670 to Bates discloses a plant stand.

U.S. Pat. No. 4,833,823 to Edwards, III discloses a potted plant support.

U.S. Pat. No. Des. 278,465 to Goldman et al. discloses the ornamental design for an aquarium ornament.

U.S. Pat. No. 4,318,945 to Goldman et al. discloses an underwater aquarium decoration assembly.

U.S. Pat. No. 4,044,721 to Foley et al. discloses a fish tank construction.

U.S. Pat. No. 4,534,130 to Rogers discloses a flower tote.

U.S. Pat. No. 4,129,960 to Gale discloses interlocking blocks.

While these devices fulfill their respective, particular objective and requirements, the aforementioned patents do not describe a plant support device for aquariums and water gardens for supporting plants for use within a water environment.

In this respect, the plant support device for aquariums and water gardens according to the present invention substantially departs from the conventional concepts and designs of the prior art, and in doing so provides an apparatus primarily developed for the purpose of supporting plants for use within a water environment.

Therefore, it can be appreciated that there exists a continuing need for new and improved plant support device for aquariums and water gardens which can be used for supporting plants for use within a water environment. In this regard, the present invention substantially fulfills this need.

SUMMARY OF THE INVENTION

In the view of the foregoing disadvantages inherent in the known types of plant stands now present in the prior art, the present invention provides an improved plant support device for aquariums and water gardens. As such, the general purpose of the present invention, which will described subsequently in greater detail, is to provide a new and improved plant support device for aquariums and water gardens and method which has all the advantages of the prior art and none of the disadvantages.

To attain this, the present invention essentially comprises a plurality of cylindrical base members each having a planar top end, a planar lower end, a cylindrical side wall therebetween, and a hollow interior. The planar top end has an annular flange extending upwardly therefrom. The planar lower end has an annular recess formed therein. The annular recess is of an equal diameter as that of the annular flange of the planar top end whereby an annular flange of a first cylindrical base member is received within an annular recess of a second cylindrical base member in a stacked configuration. An uppermost cylindrical base member is adapted for coupling with a lower end of a potted plant. The cylindrical side wall has a plurality of openings formed therein coextensive with the hollow interior.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved plant support device for aquariums and water gardens which has all the advantages of the prior art plant stands and none of the disadvantages.

It is another object of the present invention to provide a new and improved plant support device for aquariums and water gardens which may be easily and efficiently manufactured and marketed.

It is a further object of the present invention to provide a new and improved plant support device for aquarium and water gardens which is of durable and reliable construction.

An even further object of the present invention is to provide a new and improved plant support device for aquariums and water gardens which is susceptible of a low cost of manufacture with regard to both materials and labor, and which accordingly is then susceptible of low prices of sale to the consuming public, thereby making such a plant support device for in aquariums and water gardens economically available to the buying public.

Still yet another object of the present invention is to provide a new and improved plant support device for aquariums and water gardens which provides in the apparatuses and methods of the prior art some of the advantages thereof, while simultaneously overcoming some of the disadvantages normally associated therewith.

Even still another object of the present invention is to provide a new and improved plant support device for aquariums and water gardens for supporting plants for use within a water environment.

Lastly, it is an object of the present invention to provide a new and improved plant support device for aquariums and water gardens including a plurality of cylindrical base members each having an annular flange extending upwardly therefrom. A planar lower end has an annular recess formed therein. The annular recess is of an equal diameter as that of the annular flange whereby an annular flange of a first cylindrical base member being received within an annular recess of a second cylindrical base member in a stacked configuration. An uppermost cylindrical base member is adapted for coupling with a lower end of a potted plant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
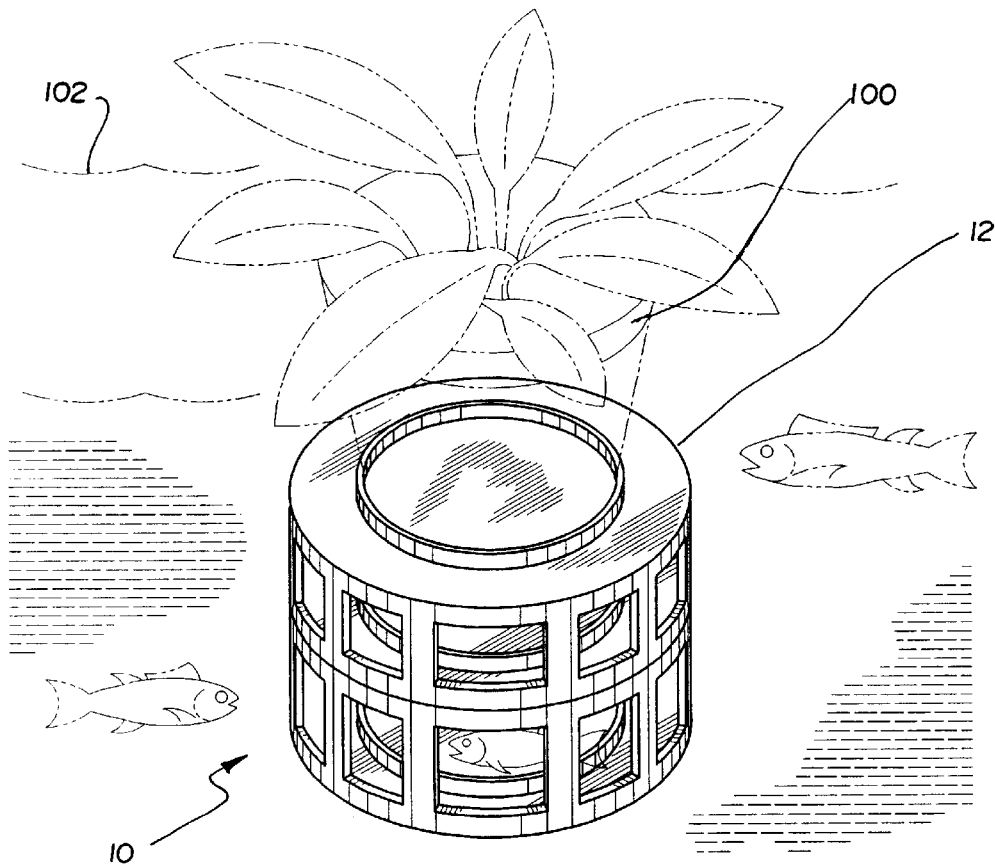
FIG. 1 is a perspective view of the preferred embodiment of the plant support device for aquariums and water gardens constructed in accordance with the principles of the present invention.
Figure 2:
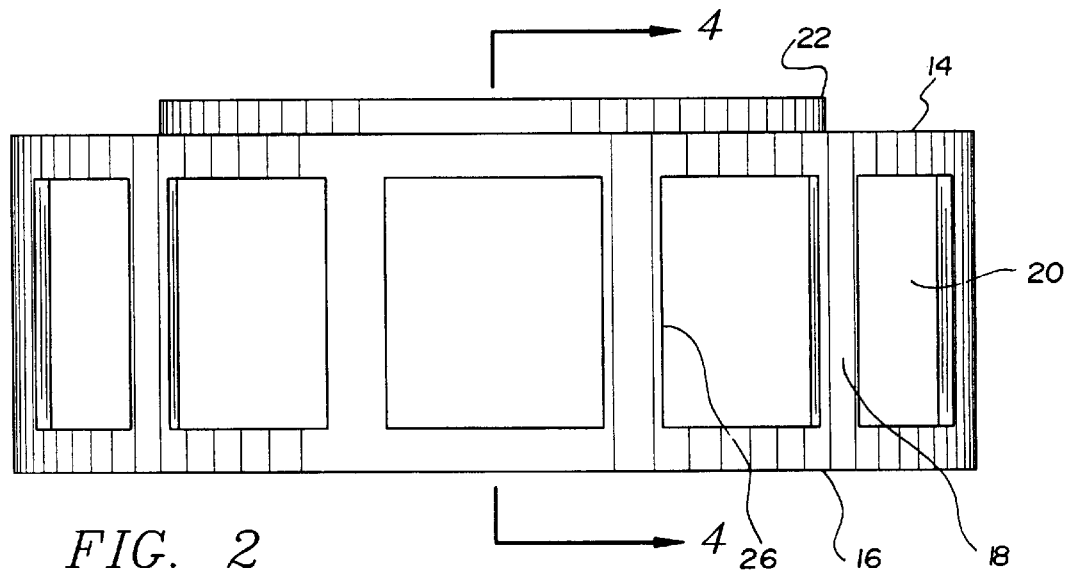
FIG. 2 is a side elevation view of the present invention.
Figure 3:
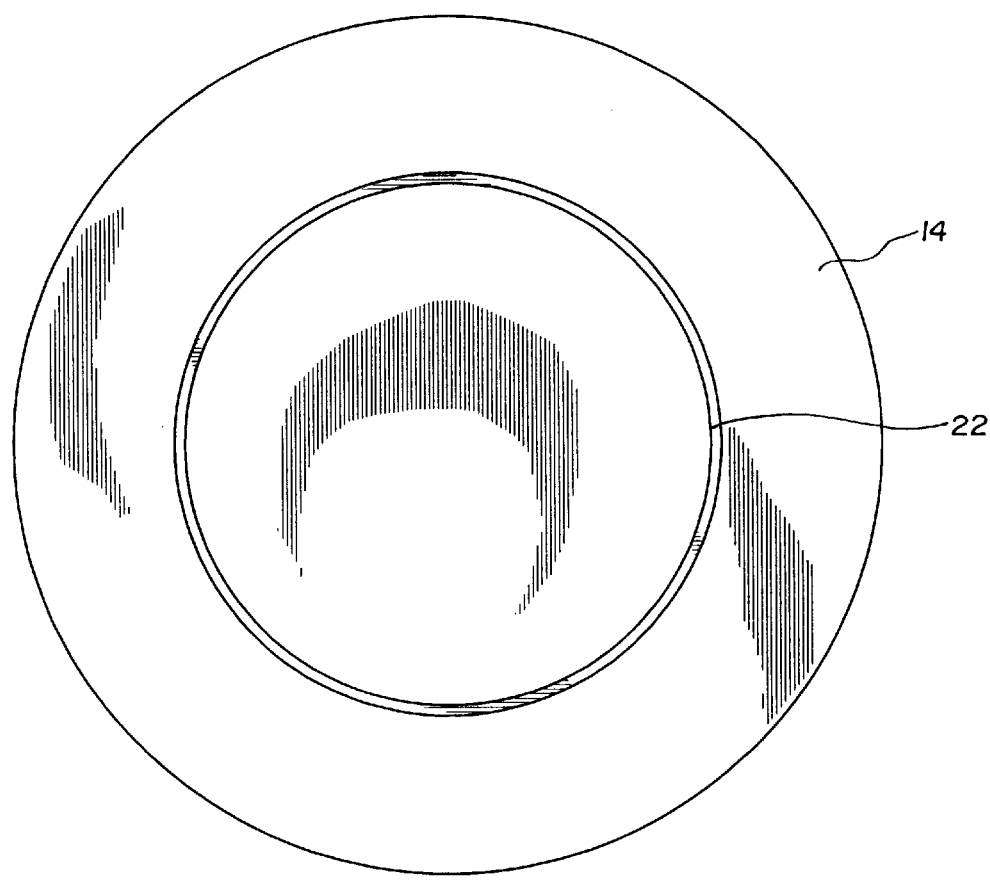
FIG. 3 is a plan view of the preferred embodiment of the present invention.
Figure 4:
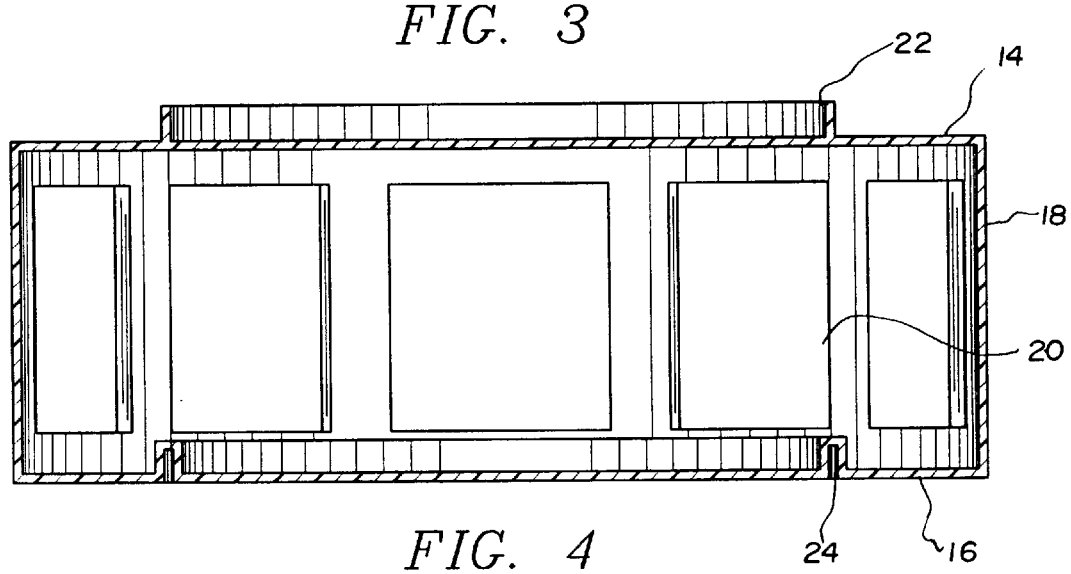
FIG. 4 is a cross-sectional view as taken along line 4—4 of FIG. 2.
Figure 5:
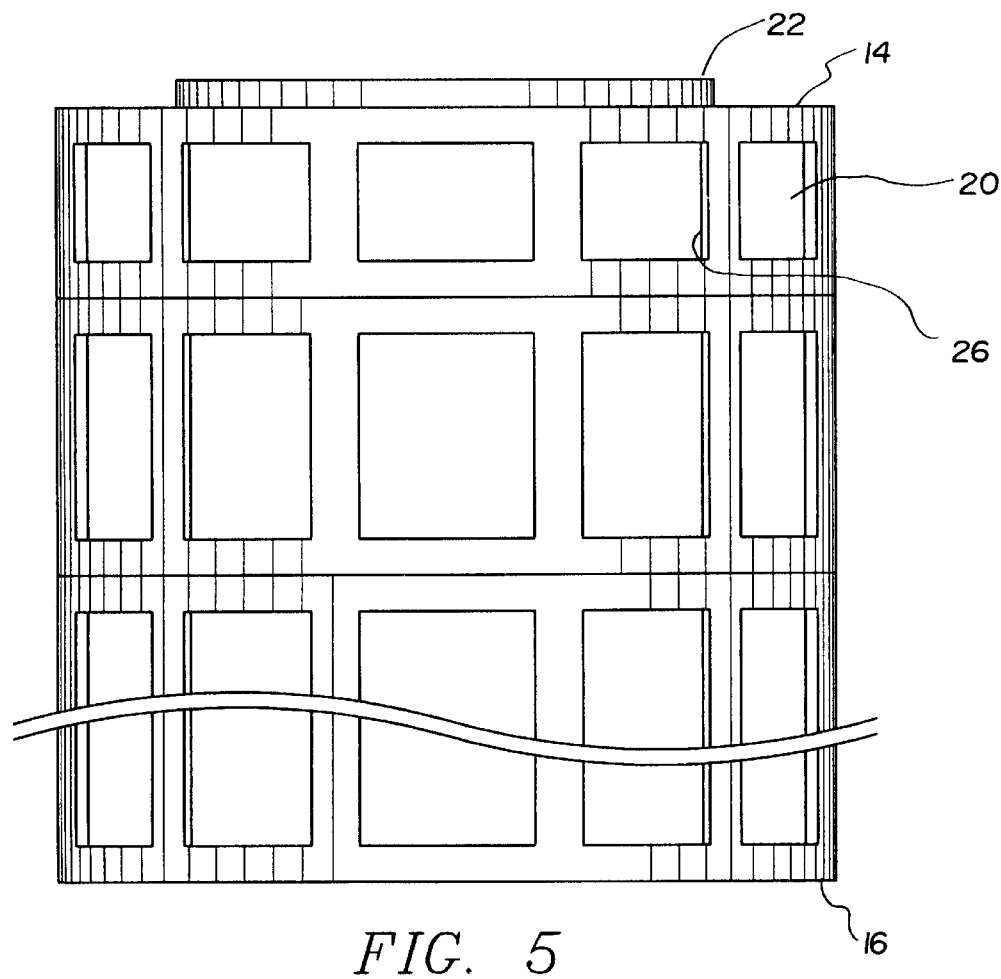
FIG. 5 is a front elevation view of the present invention illustrated in a stacked configuration.

With reference now to the drawings, and in particular, to FIGS. 1–6 thereof, the preferred embodiment of the new and improved plant support device for use in aquariums and water gardens embodying the principles and concepts of the present invention and generally designated by the reference number 10 will be described.

Specifically, it will be noted in the various Figures that the device relates to a new and improved plant support device for aquariums and water gardens for supporting plants for use within a water environment. In its broadest context, the device consists of a number of hollow stackable base members for use in supporting a plant. Such components are individually configured and correlated with respect to each other so as to attain the desired objective.

The device 10 includes a plurality of cylindrical base members 12 each having a planar top end 14, a planar lower end 16, a cylindrical side wall 18 therebetween, and a hollow interior 20. The planar top end 14 has an annular flange 22 extending upwardly therefrom. The planar lower end 16 has an annular recess 24 formed therein. The annular recess 24 is of an equal diameter as that of the annular flange 22 of the planar top end 14 whereby an annular flange 22 of a first cylindrical base member is received within an annular recess 24 of a second cylindrical base member in a stacked configuration. An uppermost cylindrical base member 12 is adapted for coupling with a lower end of a potted plant 100. The cylindrical side wall 18 has a plurality of openings 26 formed therein coextensive with the hollow interior 20. The plurality of openings 26 resemble windows arranged around the entire surface of the cylindrical side wall 18. The cylindrical base members 12 are stacked upon one another until the upper most base member 12 is at a level equal or near to the surface of the water 102. This allows the potted plant 100 to be placed within the annular flange 22 of the uppermost base member 12. The plurality of openings 26 allow water to circulate within the hollow interior 20 of the plurality of cylindrical base members 12 to allow fish to swim therein (if the water environment is an aquarium).

Figure 6:
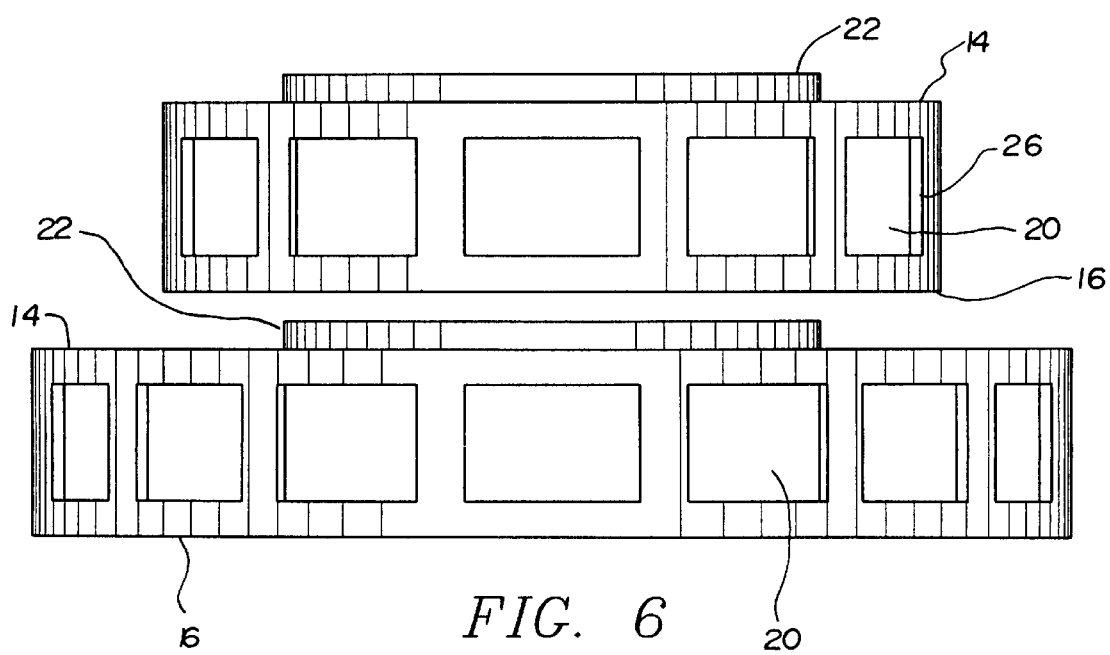
FIG. 6 is a front elevation view of a second embodiment of the present invention.

A second embodiment of the present invention is shown in FIG. 6 and includes substantially all of the components of the present invention wherein the first cylindrical base member has a diameter greater than a diameter of the second cylindrical member. In this embodiment, the diameters of the cylindrical base members 12 decrease as the height of the stacked configuration increases whereby the end result resembles a pyramid.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A plant support device for aquariums and water gardens for supporting plants for use within a water environment comprising, in combination:

a plurality of cylindrical base members each having a planar top end, a planar lower end, a cylindrical side wall therebetween, and a hollow interior, the planar top end having an annular flange extending upwardly therefrom, the planar lower end having an annular recess formed therein, the annular recess being of an equal diameter as that of the annular flange of the planar top end whereby an annular flange of a first cylindrical base member being received within an annular recess of a second cylindrical base member in a stacked configuration, an uppermost cylindrical base member being adapted for coupling with a lower end of a potted plant, the cylindrical side wall having a plurality of openings formed therein coextensive with the hollow interior.

2. A plant support device comprising:

a plurality of cylindrical base members each having an annular flange extending upwardly therefrom, a planar lower end having an annular recess formed therein, the annular recess being of an equal diameter as that of the annular flange whereby an annular flange of a first cylindrical base member being received within an annular recess of a second cylindrical base member in a stacked configuration, an uppermost cylindrical base member being adapted for coupling with a lower end of a potted plant;

the cylindrical side wall of each cylindrical base member having a plurality of openings formed therein coextensive with the hollow interior.

3. The device as set forth in claim 2 wherein the first cylindrical base member having a diameter greater than a diameter of the second cylindrical member.

\* \* \* \* \*